United States Patent
Scribano

(10) Patent No.: US 12,077,221 B2
(45) Date of Patent: Sep. 3, 2024

(54) DEVICE FOR RAISING AND LOWERING A SPARE WHEEL OF A VEHICLE, HAVING ENGAGEMENT SURFACES

(71) Applicant: PROMA S.P.A., S. Nicola la Strada (IT)

(72) Inventor: Giovanni Scribano, Collegno (IT)

(73) Assignee: PROMA S.P.A., S. Nicola la Strada (IT)

(*) Notice: Subject to any disclaimer, the term of this patent is extended or adjusted under 35 U.S.C. 154(b) by 133 days.

(21) Appl. No.: 17/620,540

(22) PCT Filed: Jun. 16, 2020

(86) PCT No.: PCT/IB2020/055619
§ 371 (c)(1),
(2) Date: Dec. 17, 2021

(87) PCT Pub. No.: WO2020/254963
PCT Pub. Date: Dec. 24, 2020

(65) Prior Publication Data
US 2022/0315136 A1 Oct. 6, 2022

(30) Foreign Application Priority Data
Jun. 17, 2019 (IT) .......................... 102019000009111

(51) Int. Cl.
*B62D 43/04* (2006.01)
(52) U.S. Cl.
CPC ................................ *B62D 43/045* (2013.01)

(58) Field of Classification Search
CPC ............................. B62D 43/04; B62D 43/045
See application file for complete search history.

(56) References Cited

U.S. PATENT DOCUMENTS

| | | | | |
|---|---|---|---|---|
| 5,290,014 A * | 3/1994 | Fergison, Jr. | ........ | B62D 43/045 242/396.2 |
| 6,443,846 B1 * | 9/2002 | Dziedzic | ............. | B62D 43/045 464/41 |
| 9,359,019 B2 * | 6/2016 | Fujiwara | ................ | B62D 43/04 |

FOREIGN PATENT DOCUMENTS

| | | |
|---|---|---|
| CA | 2024565 A1 | 3/1992 |
| CN | 208515712 U | 2/2019 |
| WO | 2007/088231 A1 | 8/2007 |
| WO | 2009/115817 A2 | 9/2009 |

OTHER PUBLICATIONS

International Search Report and Written Opinion for PCT/IB2020/055619 (Sep. 10, 2020).

* cited by examiner

*Primary Examiner* — Corey N Skurdal
(74) *Attorney, Agent, or Firm* — Merchant & Gould P.C.

(57) ABSTRACT

A device for raising and lowering a spare wheel of a vehicle includes a body to be mounted to the vehicle in a fixed position. The body includes a first indented surface defining an aperture, A lifter mechanism for raising and lowering the spare wheel includes a rotatable element capable of rotating relative to the body. The rotatable element is at least partly housed in the aperture and has a second indented surface. The first and second indented surfaces are configured to mutually interfere, in order to hinder the rotation of the rotatable element relative to the body.

13 Claims, 2 Drawing Sheets

DEVICE FOR RAISING AND LOWERING A SPARE WHEEL OF A VEHICLE, HAVING ENGAGEMENT SURFACES

This application is a National Stage Application of International Application No. PCT/IB2020/055619, filed Jun. 16, 2020, which claims benefit of Ser. No. 102019000009111, filed Jun. 17, 2019, in Italy and which applications are incorporated herein by reference. To the extent appropriate, a claim of priority is made to each of the above-disclosed applications.

The present invention relates to a device for raising and lowering a spare wheel of a vehicle.

In vehicles equipped with a big spare wheel, such as, for example, vans, off-road vehicles and the like, the spare wheel is generally positioned externally under the luggage compartment of the vehicle. In general, the spare wheel is arranged horizontally in proximity of the rear bumper of the vehicle. In these cases, since the spare wheel is generally big and heavy, the vehicle is equipped with a device that permits raising and lowering the spare wheel. The devices known in the art consist of a manually operated actuation device through which the user controls, via a flexible cable, the raising and lowering of the wheel. For safety reasons, such devices must be provided with a system for firmly holding the wheel in the raised position.

However, one drawback of the systems known in the art lies in the fact that, due to the vibrations that are generated while driving the vehicle, there is a risk that the spare wheel might go down and come out of its housing, with consequent safety risks.

The present invention aims at providing a device for raising and lowering the spare wheel of a vehicle, which can overcome the drawbacks of the prior art, and which can be manufactured in a simple and economical manner.

According to the present invention, such aim is achieved through a device having the features set out in claim 1.

The features and advantages of the device according to the present invention will become apparent in light of the following detailed description, which is provided merely as a non-limiting example with reference to the annexed drawings, wherein.

Figure 1:
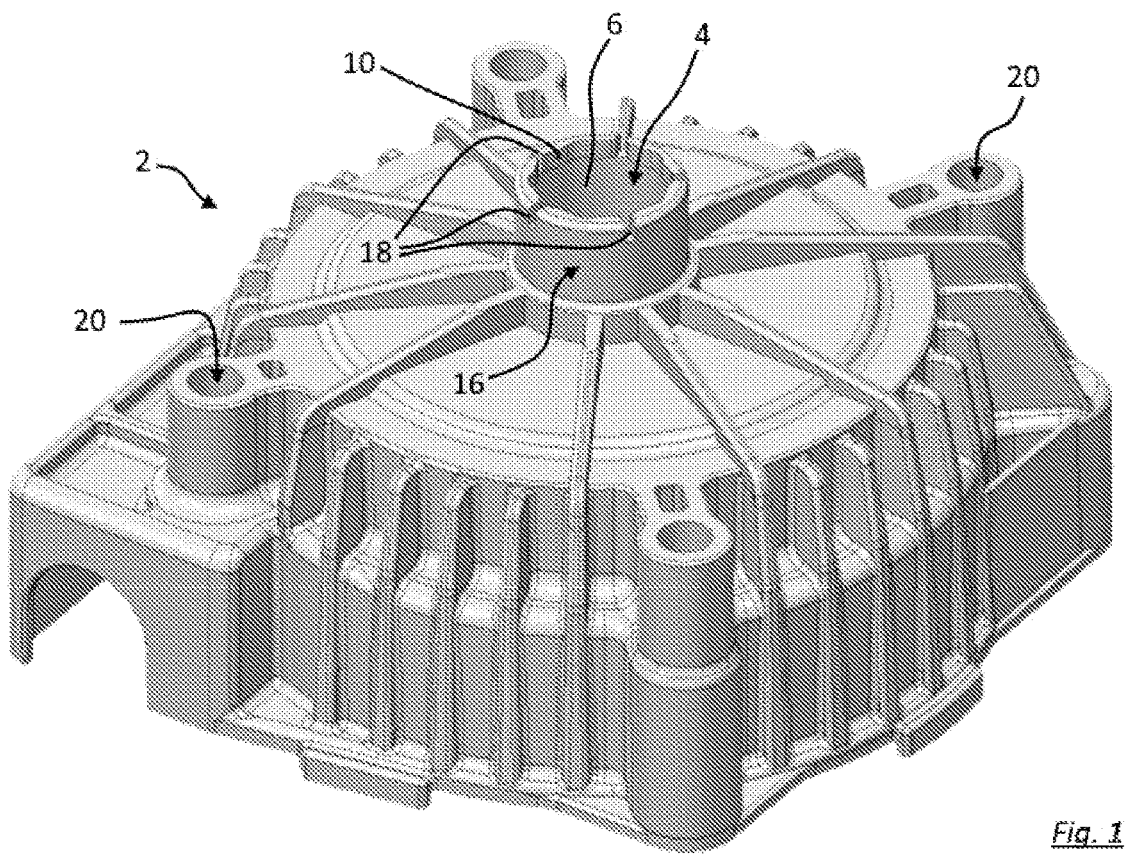
FIG. 1 is a perspective view of a body of the device according to an embodiment of the present invention.

With reference to the drawings, it is shown a device for raising and lowering a spare wheel of a vehicle. The device comprises:

a body 2 intended to be mounted to the vehicle in a fixed position, and comprising a first indented surface 10 defining an aperture 4, a mechanism for raising and lowering the spare wheel, comprising a rotatable element 8 capable of rotating relative to body 2, wherein rotatable element 8 is at least partly housed in aperture 4 and comprises a second indented surface 12.

The first and second indented surfaces 10, 12 are configured to mutually interfere, in order to hinder the rotation of rotatable element 8 relative to body 2. The first indented surface 10 surrounds the second indented surface 12.

In particular, the rotation of rotatable element 8 is connected to the raising and lowering of the spare wheel. In particular, rotatable element 8 is adapted to rotate about its own axis of rotation.

In the preferred example, the first and second indented surfaces 10, 12 are substantially circular. In particular, the first indented surface 10 is substantially tubular and houses, at least partially, rotatable element 8. In particular, aperture 4 is a hole. The first and second indented surfaces 10, 12 comprise a plurality of projections or corrugations or protrusions, and recesses, which are preferably evenly distributed over the first and second indented surfaces 10, 12. Conveniently, indented surfaces 10, 12 are corrugated surfaces. In the example shown herein, the protrusions and the recesses of such corrugates surfaces are longitudinal and, in particular, straight. In particular, the protrusions and the recesses are aligned parallel to the axis of rotation about which rotatable element 8 is intended to rotate as it turns relative to body 2. According to one possible variant of the invention, the indented surface 10, 12 comprises punctual reliefs, e.g. points, hemispheres, cylinders, prisms. Such reliefs mutually cooperate to hinder or prevent the rotation of rotatable element 8 relative to body 2.

In the example, the corrugations (generally protrusions and recesses) are located on a radially external surface of rotatable element 8 and on a radially internal surface of body 2, which defines aperture 4.

Preferably, the first and second indented surfaces 10, 12 have an outer profile that is rounded or has no sharp edges. In particular, the protrusions, as well as any recesses, on such indented surfaces 10, 12 are rounded and have no sharp edges. Thus, when the user turns the rotatable element, the tactile perception of the rotation action, e.g. exerted by means of a tool, will be smoother; this means that the feeling that rotatable element 8 is moving in jerks within aperture 4 is minimized. Moreover, this also reduces the wear of the protrusions and recesses of corrugated or indented surfaces 10, 12, caused by the rotation of rotatable element 8 in aperture 4.

Conveniently, rotatable element 8 is configured to be rotated by a user by means of a tool, for the purpose of raising and lowering the spare wheel. In the example, rotatable element 8 has an engagement portion, e.g. a housing 14, for mechanically engaging with the user's tool, which may be, for example, a spanner or an Allen wrench, in order to rotate rotatable element 8.

Therefore, the conformations of the first and second indented surfaces 10, 12 are such as to hinder or prevent the unintentional lowering of the spare wheel, in particular caused by the vibrations generated while driving the vehicle, but they allow a user to rotate said rotatable element 8 in order to actuate the mechanism, so that said wheel can intentionally be lowered or raised.

During such rotation of rotatable element 8 in hole 4, the protrusions of the first indented surface 10 rest against the protrusions of the second indented surface 12, thereby offering mechanical resistance to the rotation of the rotatable element 8 in hole 4. The user will have to exert additional force to overcome such resistance and turn rotatable element 8. In particular, the indented surfaces 10, 12, in particular the corrugated surfaces, have complementary shapes; that is to say, the protrusions and the recesses of such surfaces 10, 12 are mutually complementary.

Conveniently, body 2 comprises weakening areas at the first indented surface 10. Preferably, there are a plurality of weakening areas. Such weakening areas ensure a greater deformation of the first indented surface 10 during the rotation of rotatable element 8. Therefore, the weakening areas facilitate the rotation of rotatable element 8, while safeguarding the integrity and durability of the first indented surface 10 and hence of body 2. For example, the weakening areas are notches 18. Preferably, the weakening areas are evenly distributed over the first indented surface 10; in other terms, the weakening areas are mutually equidistant. According to one possible variant of the invention, the weakening areas are created by means of thinner regions of the walls whereon the first indented surface 10 is formed.

In the example, body 2 comprises a cylindrical portion 16 having a radially external surface, and a radially internal surface 6 on which the first indented surface 10 is located. Cylindrical portion 16 has a cylindrical wall, conveniently circular in shape. Cylindrical portion 16, in particular one end of such cylindrical portion 16 (in FIG. 1, an upper end thereof), comprises the weakening areas. Conveniently, at the end of cylindrical portion 16 there are notches 18, preferably evenly distributed over such end. In the example shown herein, there are five notches 18. Notches 18 connect the radially internal 6 and external surfaces of cylindrical portion 16. The upper end of cylindrical portion 16 is, therefore, an edge. In particular, the first indented surface 10 is divided by notches 18; in other terms, it 10 is interrupted at notches 18. In the particular example shown herein, the first indented surface 10 occupies only a part of the radially internal surface of cylindrical portion 16, and in particular is located near the upper end of cylindrical portion 16. According to one possible variant of the invention, the cylindrical wall of cylindrical portion 16 may in some areas be thinner than in nearby regions, rather than being provided with notches 18, such thinner areas acting as weakening areas.

In the example, cylindrical portion 16 protrudes from body 2, or at least from a part of body 2 which is adjacent to cylindrical portion 16. In particular, cylindrical portion 16 is a top portion of body 2. In the example, the first indented surface 10 is made as one piece with body 2, and in particular with cylindrical portion 16. Body 2 may be made of polymeric material, e.g. by injection moulding. Rotatable element 8 is conveniently metallic.

Figure 2:
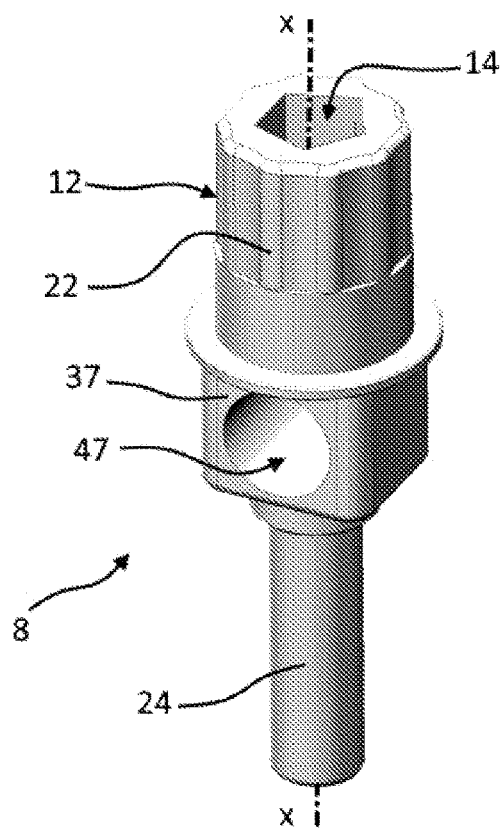
FIG. 2 is a perspective view of a rotatable element of the device according to an embodiment of the present invention.

With reference to the illustrated example, the second indented surface 12 is located at one end of rotatable element 8. In FIG. 2, numeral 22 designates the protrusions of rotatable element 8. Rotatable element 8 comprises a pin 24 at its other end. Rotatable element 8 is adapted to rotate about an axis of rotation x-x. Rotatable element 8 shown herein has an elongate shape, which in particular develops along a longitudinal axis (which is vertical in FIG. 2), which corresponds, in particular, to the axis of rotation x-x. The illustrated rotatable element 8 is substantially a shaft connected to the lifter mechanism.

Body 2 illustrated herein has a series of seats 20 for receiving respective screws 21 or bolts, which may serve to mount body 2 to the vehicle. In the preferred example shown herein, body 2 defines a cavity for housing, at least partly, the mechanism for raising and lowering the spare wheel; such mechanism may also be a per se known one. TBody 2 has, therefore, a concave shape. Thus, the illustrated body 2 also acts as an enclosure for the lifter mechanism.

The following will describe a preferred lifter mechanism with reference to the annexed figures.

Rotatable element 8 is adapted to control, as it rotates, the lowering and raising of the spare wheel through the lifter mechanism. In particular, rotatable element 8 is adapted to control the winding and unwinding of a cable that supports said spare wheel.

Figure 3:
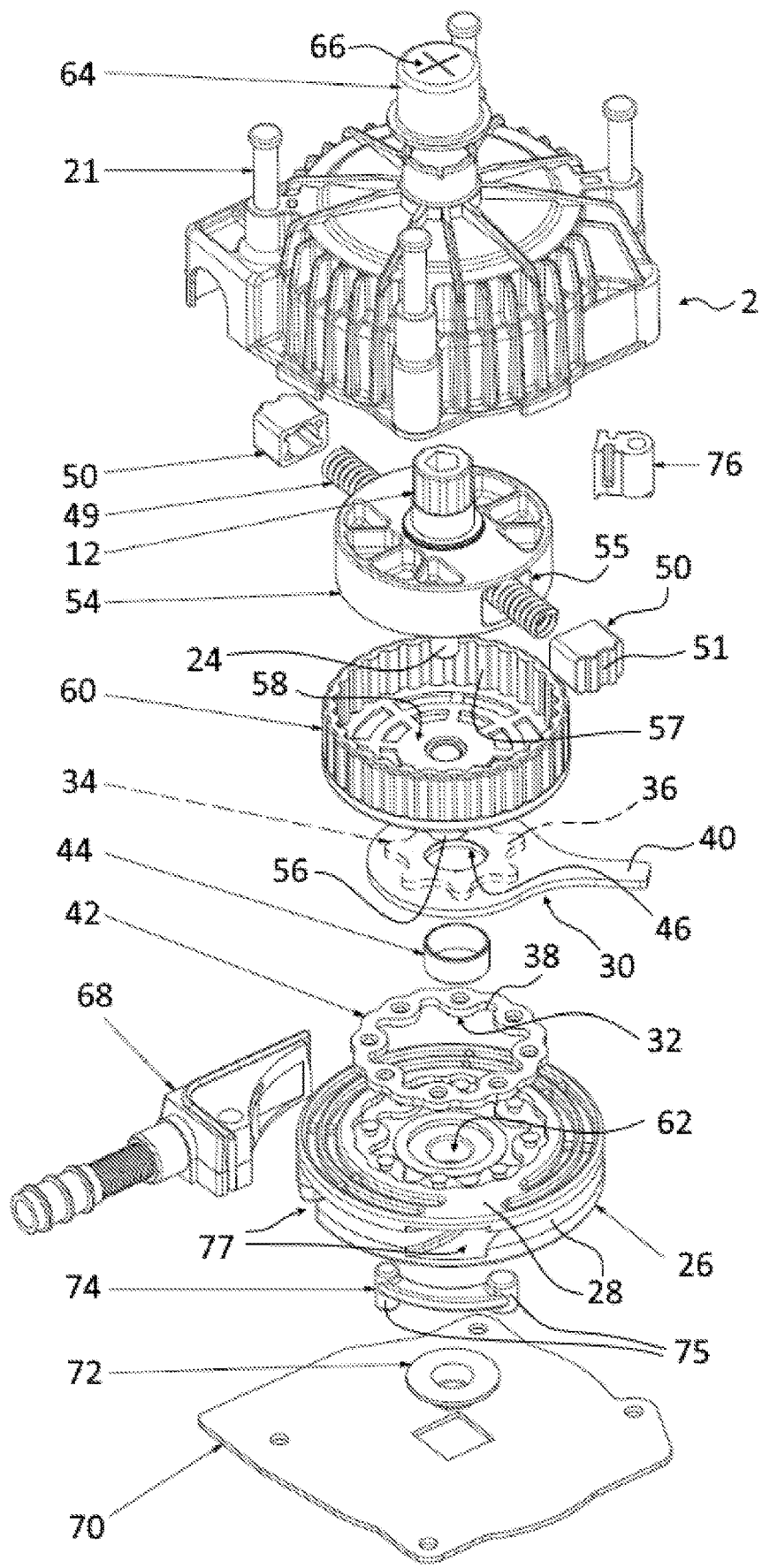
FIG. 3 is an exploded view of a body of the device according to an embodiment of the present invention.

With reference to FIG. 3, the lifter mechanism comprises a rotatable support 26, which conveniently is a reel-shaped element around which the cable is intended to be wound. The reel-shaped element shown herein has two flanges 28, between which the cable is arranged. Rotatable support 26 is adapted to rotate about an axis of rotation, which in the example coincides with the axis of rotation x-x of rotatable element 8. As it rotates, rotatable element 8 causes the rotation of rotatable support 26. Such elements 8, 26 are rotatably connected together.

Preferably, the lifter mechanism comprises a transmission system configured for reducing the rotation of rotatable element 8 relative to the rotation of rotatable support 26. Conveniently, a first rotation (e.g. 30°) of rotatable element 8 about its axis of rotation x-x corresponds to a second rotation (e.g. 10°) of rotatable support 26 about its axis of rotation, wherein the second rotation is smaller than the first rotation. In this way, the user can benefit from a favourable lever ratio when turning rotatable element 8, so that the spare wheel can be easily raised or lowered. In the example, rotatable element 8 and rotatable support 26 are constrained to each other in such a way that they will rotate in the same direction of rotation (e.g. clockwise). In accordance with the invention, further transmission systems may be adopted between rotatable element 8 and rotatable support 26, with or without a reducing effect.

In particular, the transmission system comprises an engagement element 30 mounted to rotatable support 26, wherein engagement element 30 and rotatable support 26 are adapted to mutually move with an epicyclical motion. In particular, rotatable support 26 comprises a first circular engagement surface 32. Engagement element 30 comprises a second circular engagement surface 34 adapted to engage with the first engagement surface 32, wherein such first and second engagement surfaces 32, 34 have different diameters. In particular, the diameter of the first engagement surface 32 is greater than the diameter of the second engagement surface 34. The first engagement surface 32 is radially external to the second engagement surface 34. The first and second engagement surfaces 32, 34 are adapted to roll one over the other, engaging with each other. In the example, the first engagement surface 32 is in a radially internal position, and the second engagement surface 34 is in a radially external position. In FIG. 3, the second engagement surface 34 is formed on a bottom portion of engagement element 30 and is drawn with a dashed line.

Preferably, the second engagement surface 34 is a toothed surface. In fact, teeth 36 alternate evenly thereon, which conveniently have a rounded tip. The first engagement surface 32 has a plurality of recesses 38 for receiving teeth 36, thus allowing the relative rolling of the two engagement surfaces 32, 34 in the area where they 32, 34 are in mutual contact.

For the purposes of the present invention, the two engagement surfaces 32, 34 are substantially circular, even though, with reference to the example shown herein, they are not perfectly circular, in that they have an indented profile to provide mutual mechanical engagement. However, they 32, 34 extend along a circumference.

In the example, the first engagement surface 32 is adapted to rotate integrally with rotatable support 26 about the axis of rotation x-x of rotatable element 8. Engagement element 30 is rotatably constrained to body 2. Therefore, engagement element 30 cannot rotate about an axis of rotation parallel to the axis of rotation of rotatable support 26. In particular, engagement element 30 has a constraining portion 40, conveniently consisting of an elongated portion (e.g. a bar), which is adapted to enter a recess of body 2 to stop the relative rotation between engagement element 30 and body 2.

Optionally, the first engagement surface 32 is formed on a crown wheel 42 constrained to rotatable support 26. As an alternative, the first engagement surface 32 is formed as one piece with rotatable support 26.

Rotatable element 8 is constrained to, in particular integral with, a cylinder 44, or cylindrical element, arranged eccentrically relative to the axis of rotation x-x. In other terms, cylinder 44 develops around a second axis, parallel to and offset from the axis of rotation x-x. Cylinder 44 is meant to be a portion at least partly cylindrical in shape; in the example, cylinder 44 is a ring. Cylinder 44 is separate from rotatable element 8, but may alternatively be made as one piece with it 8. Cylinder 44 is fitted, with freedom of rotation, into a circular seat 46 of engagement element 30. Circular seat 46 and cylinder 44 have complementary shapes. When the user turns rotatable element 8, cylinder 44 rotates in circular seat 46 about the second axis. The rotation of rotatable element 8 about the axis x-x causes cylinder 44 to rotate about the second axis, while said second axis rotates about the axis of rotation x-x of rotatable element 8.

When rotatable element 8 and rotatable support 26 rotate, engagement element 30 moves to and fro along a direction perpendicular to the axis x-x, in particular a radial direction relative to cylinder 44 or circular seat 46. In particular, it 30 moves in a longitudinal direction along which constraining portion 40 extends.

Preferably, the lifter mechanism comprises a clutch for rotatably decoupling rotatable element 8 and rotatable support 26 when the torque applied to rotatable element 8 exceeds a threshold value.

Preferably, the clutch comprises:
first and second rotatable components 54, 60,
a movable friction element 50, associated with either one of the first and second rotatable components 54, 60,
a return means 49, preferably an elastic means like a spring, tending to push friction element 50 against a friction surface 57 of either the second rotatable component 60 or, respectively, the first rotatable component 54, in order to generate friction.

The first rotatable component 54 is rotatably constrained to rotatable element 8, conveniently about the axis x-x. In the example, the second rotatable component 60 is at least rotatably constrained to cylinder 44, which in the example is a distinct element. As an alternative, they 44, 60 may be made as one piece.

The second rotatable component 60 is adapted to rotate about the same axis of rotation as that of the first rotatable component 54. In particular, friction element 50 is associated with the first rotatable component 54, and tends to abut on friction surface 57 of the second rotatable component 60.

In the example there are a pair of friction elements 50, between which return means 49 is interposed, which tends to push such friction elements 50 outwards. In the preferred example, return means 49 is an elastic means operating by compression.

Friction element 50 is preferably slidable along a guided trajectory. In particular, the first rotatable component 54 has a channel 55, or guide, in which friction element 50 can slide. Channel 55 houses return means 49. In the illustrated example, when friction element 50 is acting upon friction surface 57, said friction element 50 protrudes, at least partly, from channel 55. In particular, channel 55 is straight and intersects the axis of rotation of the first rotatable component 54; in the example, channel 55 is perpendicular to the axis of rotation of the first rotatable component 54.

Rotatable element 8 keeps the first rotatable component 54 coaxial to the second rotatable component 60, while allowing them to mutually rotate about a common axis of rotation, which is, in particular, the axis x-x. Rotatable element 8 has a hole 47 that houses return means 49. In the example shown herein, the first rotatable component 54 and the coaxial second rotatable component 60 are two distinct elements. In particular, rotatable element 8 is rotatably constrained to the first rotatable component 54 and rotatably unconstrained from the second rotatable component 60. For example, rotatable element 8 has a portion 37 (in the example, the medial portion) with a polygonal (in the example, rectangular) cross-section with reference to the axis x-x, said cross-section being received in a matching aperture (not shown) of the first rotatable component 54. In particular, portion 37 with such cross-section is the one where hole 48 is formed.

With reference to FIG. 3, friction surface 57 is provided with a radially internal circular surface of a cavity 58 of the second rotatable component 60. In the figure, cavity 58 faces upwards. The first rotatable component 54 is at least partly inserted in cavity 58. Channel 55 faces towards friction surface 57. On such friction surface 57 friction elements 50 abut through the effect of the repulsion force exerted by return means 49 interposed therebetween. In particular, friction element 50 has a friction face 51 adapted to abut on friction surface 57. For example, friction surface 57 and friction elements 50 have protrusions and recesses to ensure a predefined coefficient of friction. Therefore, by appropriately selecting this coefficient of friction, and by choosing a suitable elastic constant for return means 49, the clutch can be made to operate as required. It is thus possible to decide the threshold torque, or limit torque, applicable to rotatable element 8.

Thanks to the clutch, it is possible to prevent some parts of the device of the invention from undergoing excessive mechanical stress; in particular, it is possible to avoid an excessive tension of the cable that supports the spare wheel, thereby reducing the risk of malfunctions. For example, when the user, while putting the spare wheel into the raised idle position, exerts an excessive torque (exceeding the threshold torque of the clutch) on rotatable element 8, and hence on the first rotatable component 54, the clutch will "snap". When the clutch snaps, friction elements 50 will slide on friction surface 57, thereby allowing the mutual rotation of the first and second rotatable components 54, 60. Therefore, the first rotatable component 54 will slide relative to the second rotatable component 60. When the torque exerted by the user returns below the threshold value, the first rotatable component 54 and the second rotatable component 60 will be mutually engaged again, thus becoming again rotatably constrained about the common axis of rotation.

With reference to the particular example illustrated herein, the second rotatable component 60 has a cylindrical protrusion 56 which internally houses pin 24, and which is inserted in a circular seat 62 of rotatable support 26. Cylindrical protrusion 56 is coaxial to the axis of rotation x-x of rotatable element 8, and is held in position in circular seat 62 with freedom of rotation about such axis x-x. In particular, cylindrical protrusion 56 goes through (at least partially) the elements 30, 42, 26. Preferably, to cylinder 44 is located in a medial position of the second rotatable component 60, being in particular interposed between friction surface 57 and cylindrical protrusion 56. Preferably, the diameter of cylinder 44 is greater than that of cylindrical protrusion 56. Cylinder 44 lies on an axis parallel to and distinct from the one of cylindrical protrusion 56, thus being offset from it 56.

Advantageously, there is a protection element (conveniently shaped as a cap), e.g. made of rubber, which covers the part of rotatable element 8 that protrudes from the body, e.g. for protecting it against dust and water, preferably mounted in a removable manner. Preferably, it 64 has a cutout 66 to allow the user to fit the tool into respective housing 14 without having to remove protection element 64.

Advantageously, there is a guiding structure 68, e.g. made by co-moulding, for guiding the cable between the inside and the outside of body 2, in particular for guiding the cable towards rotatable support 26. The cable slides in guiding structure 68, which has, in particular, a tubular portion.

In the example, a closing element, in particular a plate 70, is mounted to body 2, thereby defining a cavity or housing in which the various parts of the lifter mechanism are housed. Optionally, a washer 72 secures cylindrical protrusion 56, with freedom of rotation, to plate 70.

Optionally, there is a terminal element 74 adapted to be fixed to one end of the cable in order to hold it in position on rotatable support 26. This prevents the cable from slipping on rotatable support 26. Terminal element 74 is configured for being inserted into rotatable support 26 and fixed to it, in particular to flanges 28. In the example, terminal element 74 has two thicker ends 75 adapted to fit into corresponding housings 77 on flanges 28. Conveniently, terminal element 74 is configured in a manner such as to abut on guiding structure 68 to stop any further rotation of rotatable support 26 when the cable is completely unwound from it 26.

Optionally, an insert 76 is used in order to limit or prevent the movements of constraining portion 40 of engagement element 30, in particular along the axis x-x, e.g. while the device of the invention is being installed or used.

Of course, without prejudice to the principles of the invention, the construction details and the forms of embodiment may be extensively varied from those described and illustrated herein, without however departing from the protection scope of the invention as set out in the appended claims.

The invention claimed is:

1. A device for raising and lowering a spare wheel of a vehicle, comprising:
   a body mountable to the vehicle in a fixed position, and comprising a first indented surface defining an aperture,
   a lifter mechanism for raising and lowering the spare wheel, comprising a rotatable element configured for rotating relative to the body about an axis of rotation, wherein the rotatable element is at least partly housed in the aperture and comprises a second indented surface;
   wherein the first and second indented surfaces are configured to mutually interfere, to hinder rotation of the rotatable element relative to the body;
   wherein the first and second indented surfaces each comprise a plurality of projections or corrugations or protrusions, and recesses;
   wherein, during rotation of the rotatable element in the aperture, the plurality of projections or corrugations or protrusions of the first indented surface contact the plurality of projections or corrugations or protrusions of the second indented surface, to provide mechanical resistance to the rotation of the rotatable element in the aperture.

2. The device according to claim 1, wherein the rotation of the rotatable element is connected to the raising and lowering of the spare wheel.

3. The device according to claim 1, wherein the first and second indented surfaces are substantially circular.

4. The device according to claim 3, wherein the protrusions and recesses are evenly distributed on the first and second indented surfaces.

5. The device according to claim 1, wherein the first and second indented surfaces have an outer profile that is rounded or free of sharp edges.

6. The device according to claim 1, wherein the first and second indented surfaces are corrugated surfaces.

7. The device according to claim 6, wherein the corrugated surfaces comprise a plurality of straight protrusions and recesses.

8. The device according to claim 1, wherein the rotatable element is configured to be rotated by a user by a tool, for raising and lowering the spare wheel.

9. The device according to claim 8, wherein the rotatable element comprises a contactment portion configured to mechanically contact with the tool for rotating the rotatable element.

10. The device according to claim 1, wherein the body comprises weakened areas at the first indented surface.

11. The device according to claim 10, wherein the weakened areas are notches; wherein the body comprises a cylindrical portion having a radially external surface, and a radially internal surface on which the first indented surface is located; and wherein the notches are at an end of the cylindrical portion.

12. The device according to claim 1, wherein the lifter mechanism comprises a rotatable support configured for receiving a cable to be wound for supporting said spare wheel, and a clutch for rotatably decoupling the rotatable element from the rotatable support when torque applied to the rotatable element exceeds a threshold value.

13. The device according to claim 1, comprising conformations of the first and second indented surfaces configured to hinder or prevent unintentional lowering of the spare wheel, and wherein the conformations are configured to allow a user to rotate said rotatable element to actuate the lifter mechanism, said wheel being intentionally lowerable or raisable.

\* \* \* \* \*